(12) United States Patent
De Rudder et al.

(10) Patent No.: US 11,767,783 B2
(45) Date of Patent: Sep. 26, 2023

(54) SYSTEM FOR MIXING A LIQUID SPRAY INTO A GASEOUS FLOW AND EXHAUST AFTERTREATMENT DEVICE COMPRISING SAME

(71) Applicant: Donaldson Company, Inc., Bloomington, MN (US)

(72) Inventors: Korneel De Rudder, Winksele (BE); Anil C. Agar, Leuven (BE); Corine Chauvin, Caen (FR); Bart Schellens, Overijse (BE)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 17/624,736

(22) PCT Filed: Jul. 1, 2020

(86) PCT No.: PCT/US2020/040531
§ 371 (c)(1),
(2) Date: Jan. 4, 2022

(87) PCT Pub. No.: WO2021/003291
PCT Pub. Date: Jan. 7, 2021

(65) Prior Publication Data
US 2022/0316382 A1    Oct. 6, 2022

Related U.S. Application Data

(60) Provisional application No. 62/971,344, filed on Feb. 7, 2020.

(30) Foreign Application Priority Data

Jul. 4, 2019 (EP) .................................. 19184451

(51) Int. Cl.
*F01N 3/28* (2006.01)
*B01F 25/313* (2022.01)
(Continued)

(52) U.S. Cl.
CPC ....... *F01N 3/2892* (2013.01); *B01D 53/9418* (2013.01); *B01F 23/2132* (2022.01);
(Continued)

(58) Field of Classification Search
CPC ........... B01D 53/9418; B01F 2025/913; B01F 2025/931; B01F 23/2132; B01F 25/3131;
(Continued)

(56) References Cited

U.S. PATENT DOCUMENTS 8,371,114 B2    2/2013    Hayashi et al.
9,737,907 B2    8/2017    Hornback et al.
(Continued)

FOREIGN PATENT DOCUMENTS

CN    105673150 A    6/2016
CN    106030063 A    10/2016
(Continued)

OTHER PUBLICATIONS

International Search Report and Written Opinion for PCT/US2020/040531 (dated Aug. 13, 2020).

*Primary Examiner* — Jesse S Bogue
(74) *Attorney, Agent, or Firm* — Merchant & Gould P.C.

(57) ABSTRACT

A spray/gas mixer includes a main body having a circumferential wall defining an inlet opening at one end and an outlet opening at another end; a divider baffle within the main body; a swirl duct having a first end adjacent to the wall and a second end extending to the divider baffle; an injector orifice at the first end of the swirl duct; a swirl promoting means; and a restrictor. The swirl promoting means is arranged between the divider baffle and the restric- (Continued)

tor. Gas passing through the swirl promoting means is swirled around the first longitudinal axis (A) before passing through the restrictor. The restrictor is disposed between the swirl promoting means and the second end, forcing gas reaching it from an upstream side away from a peripheral region of the interior towards a center axis of the main body.

20 Claims, 11 Drawing Sheets

(51) Int. Cl.
*B01F 25/431* (2022.01)
*B01F 23/213* (2022.01)
*B01D 53/94* (2006.01)
*F01N 3/20* (2006.01)
*B01F 25/00* (2022.01)

(52) U.S. Cl.
CPC ...... *B01F 25/3131* (2022.01); *B01F 25/4315* (2022.01); *F01N 3/2066* (2013.01); *B01F 2025/913* (2022.01); *B01F 2025/931* (2022.01); *F01N 2610/1453* (2013.01)

(58) Field of Classification Search
CPC ............... B01F 25/431; B01F 25/4315; F01N 2240/20; F01N 2470/02; F01N 2470/18; F01N 2610/02; F01N 2610/1453; F01N 3/2066; F01N 3/2892; Y02A 50/20; Y02T 10/12
See application file for complete search history.

(56) References Cited

U.S. PATENT DOCUMENTS

| | | | |
|---|---|---|---|
| 9,737,908 B2 | 8/2017 | Hornback et al. | |
| 9,784,163 B2* | 10/2017 | Noren, IV | B01F 25/10 |
| 9,810,123 B2 | 11/2017 | Kauderer et al. | |
| 9,964,016 B2 | 5/2018 | Kurikka et al. | |
| 9,995,193 B2 | 6/2018 | Alano et al. | |
| 10,047,657 B2 | 8/2018 | Noren, IV et al. | |
| 10,179,315 B2* | 1/2019 | Brandl | B01F 25/3141 |
| 10,184,433 B2 | 1/2019 | Ferront et al. | |
| 10,190,465 B2 | 1/2019 | Alano et al. | |
| 10,215,076 B2* | 2/2019 | Solipuram | F01N 13/1872 |
| 10,369,533 B2* | 8/2019 | Whitten | B01F 25/10 |
| 10,711,677 B2* | 7/2020 | Noren, IV | B01F 23/2132 |
| 11,035,277 B2* | 6/2021 | Ettorre | B01F 25/3141 |
| 11,105,241 B2* | 8/2021 | Tucker | F01N 3/103 |
| 11,110,408 B2* | 9/2021 | Kurpejovic | B01F 25/4522 |
| 11,465,105 B2* | 10/2022 | De Rudder | B01F 25/3141 |
| 2007/0163241 A1 | 7/2007 | Meingast et al. | |
| 2010/0083643 A1 | 4/2010 | Hayashi et al. | |
| 2012/0204541 A1 | 8/2012 | Li et al. | |
| 2013/0167516 A1 | 7/2013 | Loman | |
| 2015/0240692 A1 | 8/2015 | De Rudder | |
| 2016/0215673 A1 | 7/2016 | Noren, IV et al. | |
| 2016/0356200 A1 | 12/2016 | Bressler et al. | |
| 2016/0361694 A1* | 12/2016 | Brandl | B01F 25/103 |
| 2017/0114693 A1 | 4/2017 | Stelzer et al. | |
| 2017/0260888 A1 | 9/2017 | Solipuram et al. | |
| 2017/0342888 A1 | 11/2017 | Noren, IV et al. | |
| 2018/0178171 A1 | 6/2018 | Tyni et al. | |
| 2018/0298802 A1 | 10/2018 | Noren, IV et al. | |
| 2018/0326372 A1 | 11/2018 | Tyni et al. | |
| 2019/0010850 A1* | 1/2019 | Willats | F01N 3/035 |

FOREIGN PATENT DOCUMENTS

| | | |
|---|---|---|
| CN | 106246303 A | 12/2016 |
| CN | 108104912 A | 6/2018 |
| CN | 108194179 A | 6/2018 |
| CN | 109415964 A | 3/2019 |
| DE | 102011077156 A1 | 12/2012 |
| DE | 102013223313 A1 | 5/2015 |
| DE | 10201611703 A1 | 1/2018 |
| DE | 102016213409 A1 | 2/2018 |
| EP | 1241331 A2 | 9/2002 |
| EP | 2775114 B1 | 1/2016 |
| EP | 3068989 B1 | 8/2017 |
| EP | 3018311 B1 | 9/2017 |
| EP | 3327263 A1 | 5/2018 |
| EP | 3392480 A1 | 10/2018 |
| EP | 3517203 A1 | 7/2019 |
| EP | 3152424 B1 | 9/2019 |
| WO | 2015/038897 A1 | 3/2015 |
| WO | 2015/130789 A1 | 9/2015 |
| WO | 2018/001789 A1 | 1/2018 |
| WO | 2018/015148 A1 | 1/2018 |
| WO | 2018/068667 A1 | 4/2018 |
| WO | 2018/095140 A1 | 5/2018 |
| WO | 2018/226626 A1 | 12/2018 |

* cited by examiner

SYSTEM FOR MIXING A LIQUID SPRAY INTO A GASEOUS FLOW AND EXHAUST AFTERTREATMENT DEVICE COMPRISING SAME

This application is a US National Stage application of PCT International Patent application No. PCT/US2020/040531, filed Jul. 1, 2020, which claims the benefit of priority to European patent Application No. 19184451.3, filed Jul. 4, 2019, and U.S. Provisional patent Applicant Serial 62/971,344, filed Feb. 7, 2020 which applications are hereby incorporated herein by reference in their entireties. To the extent appropriate, a claim of priority is made to each of the above disclosed applications.

FIELD OF THE INVENTION

The present invention pertains to the field of systems for mixing a liquid spray into a gaseous flow, in particular systems for mixing a spray of urea solution into an exhaust flow of an internal combustion engine for the purpose of selective catalytic reduction (SCR) of $NO_x$ residues.

BACKGROUND

Vehicles equipped with diesel engines typically include exhaust systems that have aftertreatment components such as selective catalytic reduction catalyst devices, lean $NO_x$ catalyst devices, or lean $NO_x$ trap devices to reduce the amount of undesirable gases, such as nitrogen oxides ($NO_x$) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as $NO_x$, into more acceptable gases, such as nitrogen, oxygen, or carbon dioxide, or into water. However, the efficiency of the aftertreatment system depends upon how evenly the reactants are mixed with the exhaust gases.

International patent application publication no. WO 2015/130789 A1 in the name of Donaldson Company, Inc., discloses an aftertreatment arrangement for treating exhaust including a main body defining an interior, an inlet opening, and an outlet; an inlet arrangement disposed at the inlet opening; an aftertreatment substrate disposed between the inlet opening and the outlet; a restrictor arrangement disposed between a first closed end of the main body interior and the aftertreatment substrate; and a dosing arrangement configured to inject reactant into the exhaust. In an example disclosed in WO 2015/130789 A1, a baffle plate defines a solid region aligned with the restricted passageway and defines openings at locations radially offset from the restricted passageway. In some particular examples, the baffle plate defines a plurality of scoops, pipes, louvers, or other direction adjusting members that facilitate swirling or other mixing movements of the exhaust.

International patent application publication no. WO 2015/038897 A1 in the name of Donaldson Company, Inc., discloses a method of dosing and mixing exhaust gas including directing exhaust gas towards a periphery of a mixing tube that is configured to direct the exhaust gas to flow around and through the mixing tube to effectively mix and dose exhaust gas within a relatively small area. Some mixing tubes include a slotted region and a non-slotted region. Some mixing tubes include a louvered region and a non-louvered region. Some mixing tubes are offset within a mixing region of a housing.

United States patent application publication no. US 2016/0215673 A1 assigned to Tenneco Automotive Operating Company Inc. discloses an exhaust aftertreatment system, including an exhaust gas passageway and a mixer assembly. The exhaust gas passageway receives exhaust gas output from a combustion engine. The mixer assembly is disposed along the exhaust gas passageway and receives the exhaust gas. The mixer assembly includes a mixer housing, a mixing bowl and an injector housing. The mixing bowl is disposed within the mixer housing and includes an outer diametrical surface that engages an inner diametrical surface of a wall of the mixer housing. The injector housing extends through the wall and into an aperture in the mixing bowl. The aperture defines a flow path through which at least a majority of the exhaust gas entering the mixer assembly flows. The mixing bowl includes an upstream end portion having contours directing the exhaust gas toward the injector housing.

United States patent application publication no. US 2017/342888 A1 assigned to Tenneco Automotive Operating Company Inc. discloses a mixer assembly for mixing an injected reductant with an exhaust gas output from a combustion engine comprises a mixer housing including a wall defining an exhaust passageway having a longitudinal axis. A tubular swirling device housing extends along a first axis substantially transverse to the longitudinal axis. The tubular swirling device includes a plurality of openings through which exhaust gas enters. The exhaust gas within the tubular swirling device swirls about the first axis and exits at an outlet end of the tubular swirling device. A mixing plate is positioned immediately downstream of the tubular swirling device and includes apertures through which the exhaust gas exiting the outlet end of the tubular swirling device flows. The mixing plate swirls the exhaust about a second axis extending parallel to the longitudinal axis.

European patent application publication no. EP3392480 in the name of Donaldson Company, Inc., discloses a system for mixing a spray into a gaseous flow, comprising: a main body defining an interior extending from a first end to a second end, having an inlet opening and an outlet; a reaction zone between the inlet opening and the outlet, spaced from the first end to define a mixing region; a restrictor arrangement between the first end and the reaction zone, separating the mixing region into two chambers and defining a restricted passageway between the two chambers. The first chamber comprises: a dosing arrangement to receive an injector mix reactant with the gas in the first chamber; a first swirl promoting means between the inlet opening and the dosing arrangement; and a second swirl promoting means between the dosing arrangement and the restrictor arrangement, such that a gaseous flow passing through said second swirl promoting means is swirled around before entering the restricted passageway.

Chinese patent application publication no. CN105673150A in the name of Tenneco Exhaust System (Suzhou) Co Ltd discloses an exhaust gas after-treatment device comprising a shell and a mixer component installed in the shell, wherein the shell is provided with an installation base used for installation of a urea nozzle so as to spray urea into the mixer component, the mixer component comprises a mixing pipe, a bowl cover located on the bottom of the mixing pipe, and a partition board matched with the mixing pipe, and the mixing pipe comprises an airflow inlet located in the upper end and an airflow outlet located in the lower end; the shell is divided into a first cavity and a second cavity by the partition board, the first cavity is communicated with the airflow inlet, the second cavity is communicated with the airflow outlet, the mixing pipe comprises a plurality of spinning disks located at the position of the airflow inlet, the spinning disks extend into the first cavity, and the bowl cover is used for forcing airflow to flow reversely. In this way, urea evaporation distance and time are increased, and airflow mixing uniformity is improved.

German patent application publication no. DE102011077156 in the name of Bosch Emission Systems GmbH & Co KG discloses an exhaust system having an injector for introducing a reducing agent into an exhaust gas flow upstream of a selective catalyst reduction (SCR) catalyst. A mixing channel feeds the exhaust gas flow from the injector to an inlet of the SCR catalyst. The mixing channel has a helical/helically configured spiral region that is inclined at an angle of 720° with respect to a center axis.

US patent application publication no. US 2017/114693 in the name of Tenneco GmbH discloses an exhaust-gas mixing pipe for admixing additive into an exhaust-gas stream of a combustion engine. The housing wall has multiple rows, arranged over a circumference U, of openings through which gas can flow into the interior of the pipe, wherein the at least one opening of a row forms in each case one stage M characterized according to its size by the average opening cross section Q of the openings, wherein the sum of all the opening cross sections Q of all the openings of all the rows of the exhaust-gas mixing pipe is equal to SQ. In that context, at least one first-order stage M1, is provided, wherein stage M1 has openings having an average opening cross section Q1. At least one second-order stage M2, is provided, with openings having an average opening cross section Q2, where $Q2 \geq f\ Q1$, where $5 \leq f \leq 25$.

US patent application publication no. US 2017/260888 in the name of Eberspächer Exhaust Tech GmbH & Co KG discloses a mixer mixing exhaust gas flowing in an exhaust gas-carrying duct of an internal combustion engine with reactant injected into the exhaust gas-carrying duct. The mixer includes a mixer body with a reactant receiving duct, an exhaust gas inlet opening arrangement with a plurality of exhaust gas inlet openings leading to the reactant receiving duct, and at least one release duct leading away from the reactant receiving duct with a release duct opening for the release of a reactant/exhaust gas mixture from the mixer body.

US patent application publication no. US 2018/326372 A1 assigned to Proventia Emission Control OY discloses an apparatus for aftertreatment of exhaust gas including a housing having a longitudinal axis that extends between a first end and a second end of the housing; an exhaust inlet being positioned at a portion of the first end of the housing for entering exhaust gas flow into the interior of the housing; a first substrate being positioned within the interior of the housing downstream to the exhaust inlet, wherein the exhaust gas flow being configured to flow through the first substrate in direction of the longitudinal axis; mixer arrangement being positioned within the interior of the housing downstream to the first substrate and including: first flow guide arrangement configured to guide the exhaust gas flow to rotating and advancing gas flow in direction of a crosswise axis perpendicular to the longitudinal axis; a reactant inlet for dispensing reactant to the rotating and advancing gas flow, the reactant configured to mix with the exhaust gas; and second flow guide arrangement configured to guide the rotating and advancing mixed gas flow in direction of the longitudinal axis as a mixed exhaust gas flow; and a second substrate being positioned within the interior of the housing downstream to the mixer arrangement, wherein the mixed exhaust gas flow being configured to flow through the second substrate in direction of the longitudinal axis.

International patent application publication no. WO 2018/226626 A1 discloses a multi-stage mixer including a multi-stage mixer inlet, a multi-stage mixer outlet, a first flow device, and a second flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and to receive reductant such that the reductant is partially mixed with the exhaust gas within the first flow device. The first flow device includes a plurality of main vanes and a plurality of main vane apertures. The plurality of main vane apertures is interspaced between the plurality of main vanes. The plurality of main vane apertures is configured to receive the exhaust gas and to cooperate with the plurality of main vanes to provide the exhaust gas from the first flow device with a swirl flow.

There is still a need for exhaust treatment devices that are compact and that provide more efficient and effective mixing of reactants.

SUMMARY OF THE INVENTION

According to an aspect of the present invention, there is provided a system for mixing a liquid spray into a gaseous flow, the system comprising: a main body having a circumferential wall defining an interior for accommodating the gaseous flow, the interior having a first longitudinal axis (A) and extending from a first end to a second end, the first end defining an inlet opening, the second end defining an outlet opening; a divider baffle disposed inside the interior; a swirl duct disposed within the interior along a second longitudinal axis (B), the swirl duct having a first end adjacent to the circumferential wall and a second end extending to the divider baffle; an injector orifice disposed at the first end of the swirl duct and configured to receive an injector to spray reactant into the gaseous flow so that the reactant mixes with the gaseous flow in the swirl duct; a swirl promoting means; and a restrictor arrangement; the swirl promoting means being arranged between the divider baffle and the restrictor arrangement, such that gas passing through the swirl promoting means is swirled around the first longitudinal axis (A) before passing through the restrictor arrangement towards the second end; and the restrictor arrangement being disposed within the interior between the swirl promoting means and the second end, the restrictor arrangement forcing gas reaching it from an upstream side away from a peripheral region of the interior towards a center axis of the main body.

It is an advantage of the present invention that it provides improved mixing between the gaseous flow and the injected liquid in a very compact system design.

In an embodiment, the system according to the present invention further comprises an inner sleeve having an upstream end and a downstream end; the upstream end being circumferentially joined to the divider baffle and the downstream end being circumferentially joined to the swirl promoting means or the restrictor arrangement so as to leave an annular space between the inner sleeve and the circumferential wall, the annular space being in fluid communication with the inlet opening.

It is an advantage of this embodiment that it provides improved thermal insulation between the outer housing and the enclosure into which the liquid is injected, thus reducing the risk of accumulating crystalized deposits in the enclosure.

In a particular embodiment, the inner sleeve is provided with at least one opening ensuring fluid communication between the annular space and an inner volume enclosed by the inner sleeve.

It is an advantage of this embodiment that gas exchange is possible between the annular space and the inner enclosure, ensuring that the sleeve is kept at substantially the same temperature as the gaseous flow.

In a more particular embodiment, at least one opening of the inner sleeve is disposed in an area to be impacted by the reactant.

It is an advantage of this embodiment that additional gas flow is generated in the area most prone to accumulating crystalized deposits, thus reducing the risk of the latter.

In an embodiment of the system according to the present invention, the second longitudinal axis is at an angle with the first longitudinal axis. In a particular embodiment, the second longitudinal axis is substantially perpendicular to the first longitudinal axis.

It is an advantage of this embodiment that an extremely compact lay-out can be achieved.

In an embodiment of the system according to the present invention, the swirl duct and the divider baffle are configured such that the majority of a gas flow passing from an upstream side of the divider baffle towards a downstream side of the divider baffle passes through the swirl duct and through the divider baffle at the second end of the swirl duct.

The inventors have found that this configuration is particularly well suited to obtain adequate mixing, whereby allowing a minority portion of the gas flow to bypass the swirl duct/divider baffle assembly does not detrimentally affect the mixing.

In an embodiment of the system according to the present invention, the injector orifice does not pass through the circumferential wall.

In this embodiment, the injector orifice does not extend through the main body.

In an embodiment of the system according to the present invention, the divider baffle is formed as curved perforated plate.

In this embodiment, the divider baffle can be manufactured in a very efficient manner. The plate may in particular be singly perforated, i.e. provided with a single perforation towards which or through which the swirl duct extends at its second end.

According to preferred embodiments, the divider baffle comprises a mirror symmetry, e.g. with respect to a mirror symmetry plane. Within the system for mixing a liquid spray into a gaseous flow, the mirror symmetry plane preferably comprises the first longitudinal axis A. Within the system for mixing a liquid spray into a gaseous flow, the mirror symmetry plane preferably comprises the second longitudinal axis B. Preferably, the mirror symmetry plane comprises, and is defined by, both longitudinal axis A and B.

In accordance with certain aspects of the disclosure, the swirl duct comprises a mixing portion, corresponding to a portion or section where most or all of the mixing swirl is to be induced into the incoming gas flow. Preferably, the mixing portion corresponds to an axial portion comprising a first set of louvers, or to a portion comprising the louvers of largest length.

In preferred embodiments, the swirl duct comprises a mixing portion comprising a first set of louvers.

In preferred embodiments, the system further comprises a spray path protection zone.

In accordance with certain aspects of the disclosure, a spray path protection zone can be disposed at or adjacent to the doser nozzle of the injector, i.e. adjacent, below, preferably directly below the injector or injector orifice, to inhibit swirling flow from prematurely widening the spray path of the reactant. In some implementations, the spray path protection zone is defined by a perforated region of the swirl duct or first conduit upstream of the mixer (or upstream of the mixing portion of the swirl duct), preferably directly below the injector or injector orifice. In other implementations, the spray path protection zone is defined by a perforated conduit disposed within the swirl duct (or first conduit). In such embodiments, the perforated conduit can partially overlap the mixing portion of the swirl duct in axial extent.

In still other implementations, the spray path protection zone is defined by a second louvered section upstream of the mixer, i.e. upstream of the mixing portion of the swirl duct, that swirls the exhaust in an opposite direction from the mixer. The second louvered section preferably comprises louvers that are shorter than louvers of the mixing portion of the swirl duct.

In preferred embodiments, the spray path protection zone comprises a protection portion of the swirl duct adjacent to the injector orifice, the protection portion comprising perforations.

In preferred embodiments, the spray path protection zone comprises a protection portion of the swirl duct adjacent to the injector orifice, the protection portion comprising a second set of louvers adjacent to the injector orifice, the second set of louvers and the first set of louvers, if present, arranged and adapted for inducing swirl in opposite directions.

In preferred embodiments, the spray path protection zone comprises a perforated conduit disposed within the swirl duct adjacent to the injector orifice.

According to an aspect of the present invention, there is provided an exhaust treatment device for treating exhaust comprising the system for mixing a liquid spray into a gaseous flow as described above, wherein an aftertreatment substrate is disposed downstream of the outlet, and wherein the inlet is adapted to receive an exhaust flow of an internal combustion engine.

According to an aspect of the present invention, there is provided motor vehicle comprising the exhaust treatment device as described above.

According to an aspect of the present invention, there is provided a diesel engine powered machine comprising the exhaust treatment device as described above.

According to an aspect of the present invention, there is provided a swirl duct for use in a system for mixing a liquid spray into a gaseous flow, the swirl duct comprising a mixing portion comprising a first set of louvers, and a spray path protection zone. Preferably the spray path protection zone is provided at a first end of the swirl duct, and the mixing portion is provided axially separated from the spray path protection zone, e.g. at a central region of the swirl duct and/or at a second end of the swirl duct. The mixing portion can extend from an axial position below the spray protection zone towards the second end of the swirl duct, for instance up until the second end of the swirl duct.

In accordance with certain aspects of the disclosure, the spray path protection zone can be adapted for, when being disposed at or adjacent to the doser nozzle of an injector, i.e. adjacent, below, preferably directly below the injector or injector orifice, to inhibit swirling flow from prematurely widening the spray path of the reactant, e.g. before it reaches the mixing portion.

The spray path protection zone can be defined by a second louvered section, and can be adapted for swirling the exhaust in an opposite direction of the swirl induced by the mixing portion. The second louvered section preferably comprises louvers that are shorter than louvers of the mixing portion of the swirl duct.

In alternative embodiments, the spray path protection zone comprises a protection portion of the swirl duct adjacent to the injector orifice, the protection portion comprising perforations.

According to an aspect of the present invention, the use of a swirl duct as disclosed for the previous aspect in a system for mixing a liquid spray into a gaseous flow is disclosed. Preferably, the system is an exhaust gas treatment system.

The technical effects and advantages of embodiments of the exhaust treatment device, the motor vehicle, and the diesel-powered machine according to the present invention correspond, mutatis mutandis, to those of the corresponding embodiments of the system for mixing a liquid spray into a gaseous flow as described above.

BRIEF DESCRIPTION OF THE FIGURES

These and other features and advantages of embodiments of the present invention will be described in more detail with reference to the attached drawings, in which.

Throughout the figures, the same reference numerals have been used for the same or like elements.

DETAILED DESCRIPTION OF EMBODIMENTS

Figure 1:
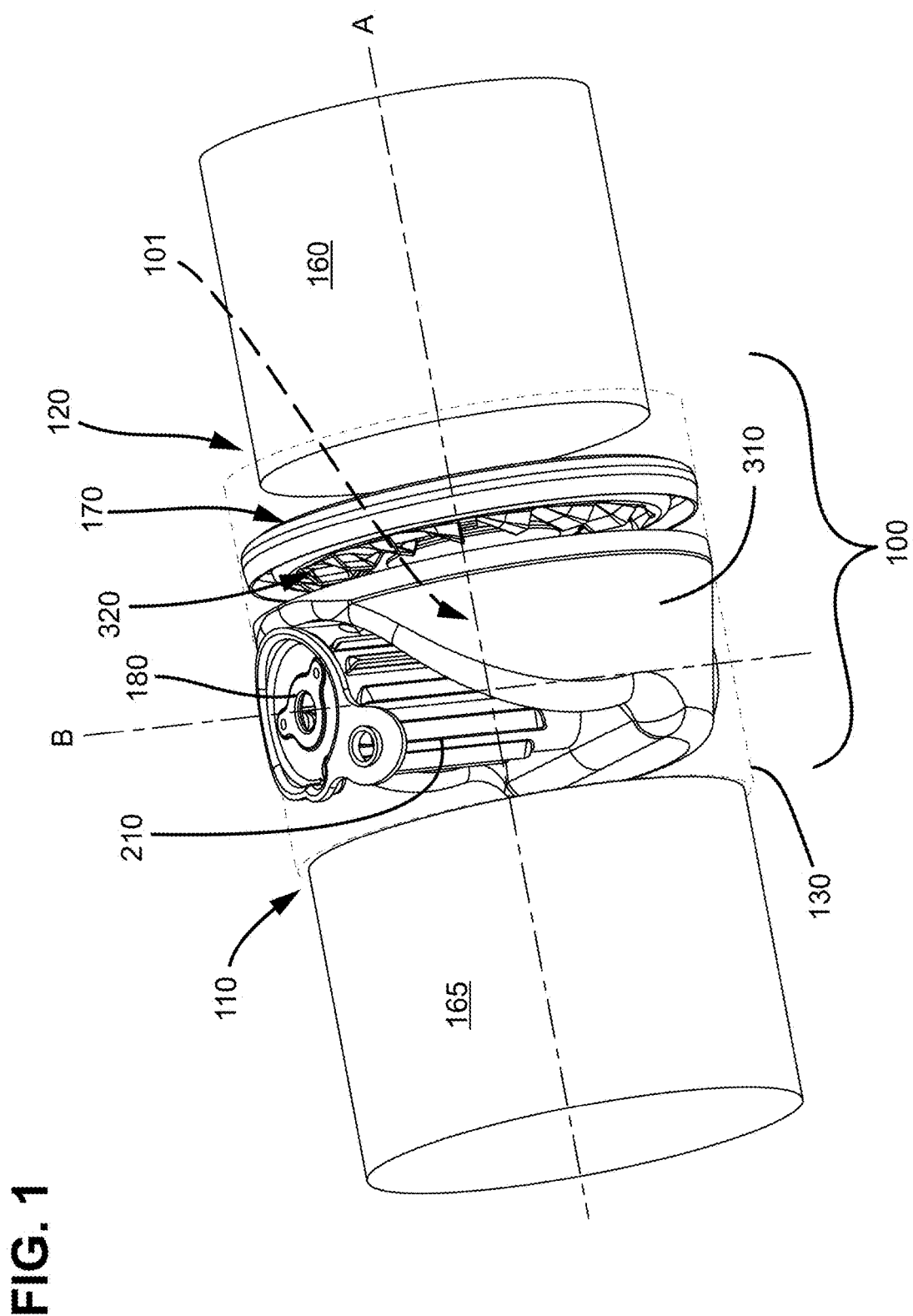
FIG. 1 illustrates a system for mixing a liquid spray into a gaseous flow according to an embodiment of the present invention.

FIG. 1 illustrates a system for mixing a liquid spray into a gaseous flow according to an embodiment of the present invention. The system comprises a main body 100 having a circumferential wall 130 defining an interior 101 for accommodating the gaseous flow, substantially along a longitudinal axis A, in a downstream direction from a first end 110 to a second end 120. The first end 110 defines an inlet opening, and the second end 120 defines an outlet opening. On the side of the outlet opening, a reactive substrate or catalyst 160 may be provided in fluid communication with the interior 101. The circumferential wall 130 may be manufactured by joining to half shells together, for example by welding, to form a cylindrically shaped duct.

Inside the interior 101, a divider baffle 310 is disposed, effectively dividing the interior 101 into what will hereinafter be called an "upstream portion" and a "downstream portion". Gas may pass from the upstream portion to the downstream portion through at least one orifice provided for that purpose. The divider baffle 310 is preferably arranged inside the interior in such a way that gas can only pass via said at least one orifice, because the interior is otherwise completely sealed off by the divider baffle 310. Most preferably, gas arriving from the upstream side can only pass through some or all of said at least one orifice after passing through a swirl duct 210 described below.

The swirl duct 210 and the divider baffle 310 may be configured to lead the larger part (e.g. more than 50%, i.e. the majority) of any gas flow reaching it from an upstream side towards a downstream side of said divider baffle 310 through the combination of the swirl duct 210 and the divider baffle 310, thus allowing only a smaller part (e.g. less than 50%, i.e. a minority) of said gas flow to bypass the combination of the swirl duct 210 and the divider baffle 310.

In the upstream portion, downstream of an optional substrate 165 (e.g. a DPF or DOC substrate), a swirl duct 210 (also referred to as a mixing tube) is disposed within the interior 101 along a second longitudinal axis B. The second longitudinal axis B may be at an angle with the first longitudinal axis A. In particular, the second longitudinal axis may be perpendicular or substantially perpendicular to the first longitudinal axis. More generally, the angle between the second longitudinal axis may also be in the preferred range of 70°-110°, or in the more preferred range of 80°-100°, or in the more preferred range of 85°-95°, which also result in a very compact arrangement.

The swirl duct 210 causes the exhaust gas to swirl about the second longitudinal axis B. In certain implementations, the swirl duct 210 defines slots through which the exhaust gas enters the swirl duct 210. In certain implementations, the swirl duct 210 includes louvers that direct the exhaust gas through the slots in a swirling flow along a circumferential direction, as described below.

The swirl duct 210 has a first end adjacent to the circumferential wall 130 and a second end extending to said divider baffle 310, as will be described in more detail below. The term "adjacent to" is meant to include an arrangement whereby the first end of the swirl duct 210 is in contact with or joined to the circumferential wall 130. In embodiments where an inner sleeve is provided inside the main body 100 (as will be described in more detail below in connection with FIG. 4), the first end of the swirl duct 210 may also be in contact with or joined to the inner sleeve, while still being considered adjacent to the circumferential wall 130. The swirl duct 210 receives the gaseous flow into its interior through openings in its outer wall. The swirl duct may for example be substantially cylindrical or frustoconical in shape. The outer wall of the swirl duct 210 may be provided with multiple protrusions at its second end, preferably in a regular pattern, to result in a castellated or saw-tooth appearance.

Depending on the arrangement of the openings in the swirl duct 210, the gas may enter from the upstream side and/or from the downstream side (after having been deflected by the divider baffle 320. The openings in the outer wall of the swirl duct 210 may be configured so as to impart a tangential component on the velocity of the gas entering the swirl duct 210, preferably a tangential component leading to a velocity vector at an angle relative to the axis of the swirl duct 210 in the range of 20°-40°, preferably 30°-35°. In view of obtaining that effect, some or all of the openings may be provided with louvers; in a particular embodiment, at least a 300 sector of the circumference does not have louvered openings.

An injector orifice 180 is disposed at the first end of the swirl duct 210 and configured to receive an injector to spray reactant into the gaseous flow so that the reactant mixes with the gaseous flow in the swirl duct 210. The injector orifice 180 may or may not extend through the circumferential wall 130. In the illustrated example, the injector orifice 180 is part of a doser seat, i.e. a structure that can be welded on the interior surface of the circumferential wall 130.

In the downstream portion, a restrictor arrangement 170 is disposed within the interior 101 between the divider baffle 310 and the second end 120, the restrictor arrangement 170 forcing gas reaching it from an upstream side away from a peripheral region of the interior 101 towards a center axis of the main body 100. This may be achieved by means of a restrictor arrangement 170 in the shape of a baffle plate that is substantially closed in in its peripheral area while having one or more orifices in its central area.

A swirl promoting means 320 is arranged between the divider baffle 310 and the restrictor arrangement 170, such that gas passing through the swirl promoting means 320 is swirled around the first longitudinal axis before passing through the restrictor arrangement 170 towards said second end 120. In this manner, the swirl promoting means 320 and the restrictor arrangement 170 cooperate to ensure maximal turbulence of the gaseous flow, and hence maximal mixing of the reactant in the gaseous flow prior to its reaching the reactive substrate or catalyst 160 that may be arranged downstream of the restrictor arrangement 170.

The swirl promoting means 320 may comprise a baffle plate defining a plurality of scoops, pipes, louvers, or other direction adjusting members.

One or more sheet metal surfaces (not illustrated) may be arranged so as to be substantially surrounded by a gaseous flow entering through said inlet opening 110, wherein the injector orifice 180 is configured so that an injection axis of any injector mounted therein intersects the one or more sheet metal surfaces. The one or more sheet metal surfaces may comprise a perforated plate 191 and a solid plate 192.

Figure 2:
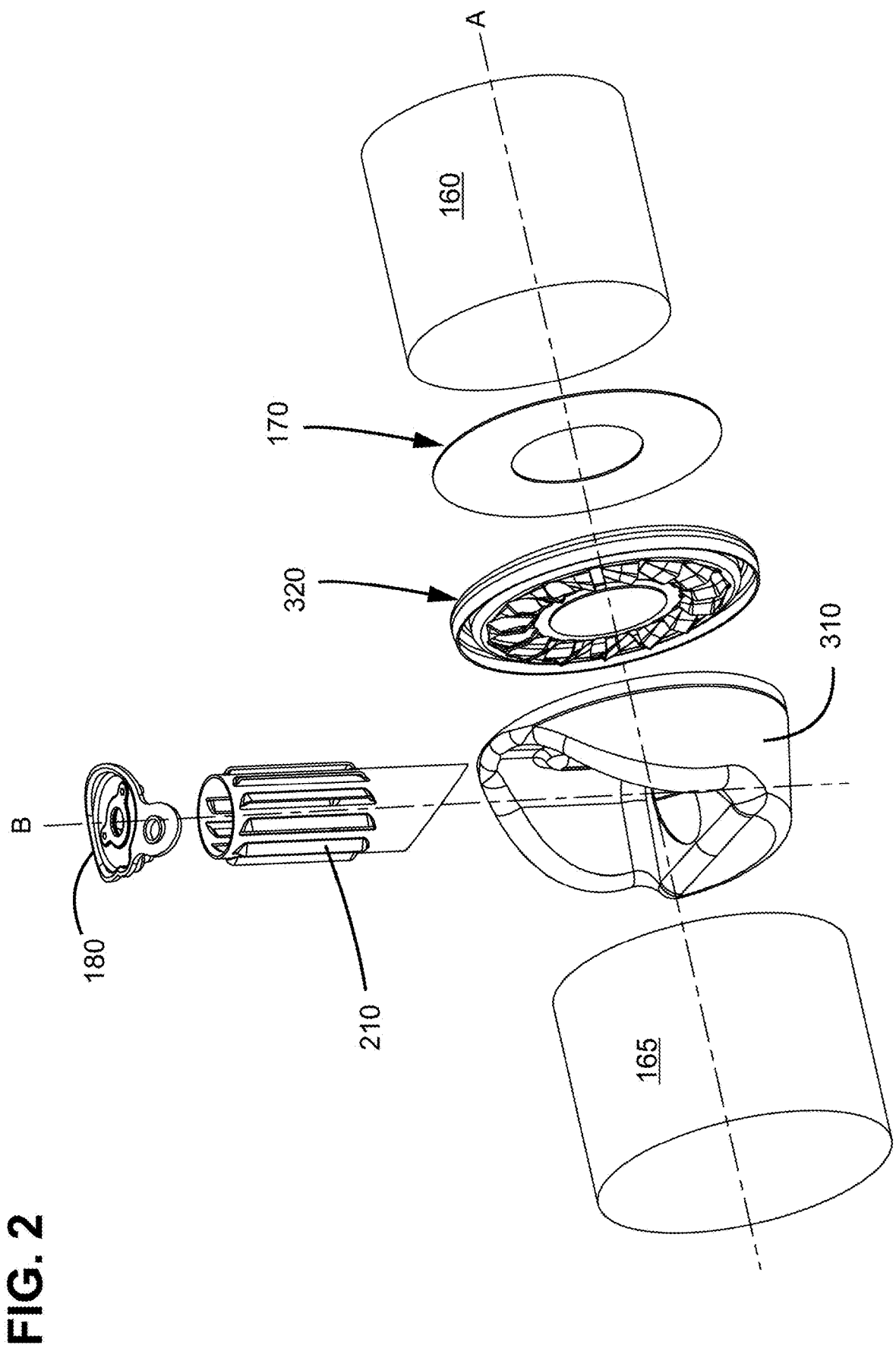
FIG. 2 presents an exploded view of the system of FIG. 1.

FIG. 2 presents an exploded view of the system of FIG. 1, without the main body 130. As can be seen in this figure, the axis of the swirl duct 210 (i.e., the second longitudinal axis B) coincides with an opening in a step portion of the divider baffle 310. In the assembled position, the second end of the swirl duct 210 extends to said divider baffle 310, so as to lead gas from the inside of the swirl duct 210 through the divider baffle 310 towards the downstream portion of the system 100. The second end of the swirl duct 210 may extend through the opening in the divider baffle 310. Alternatively, the second end of the swirl duct 210 may abut the step portion of the divider baffle 310, surrounding the opening. As a further alternative, a small gap may remain between the second end of the swirl duct 210 and the step portion of the divider baffle 310.

Figure 3:
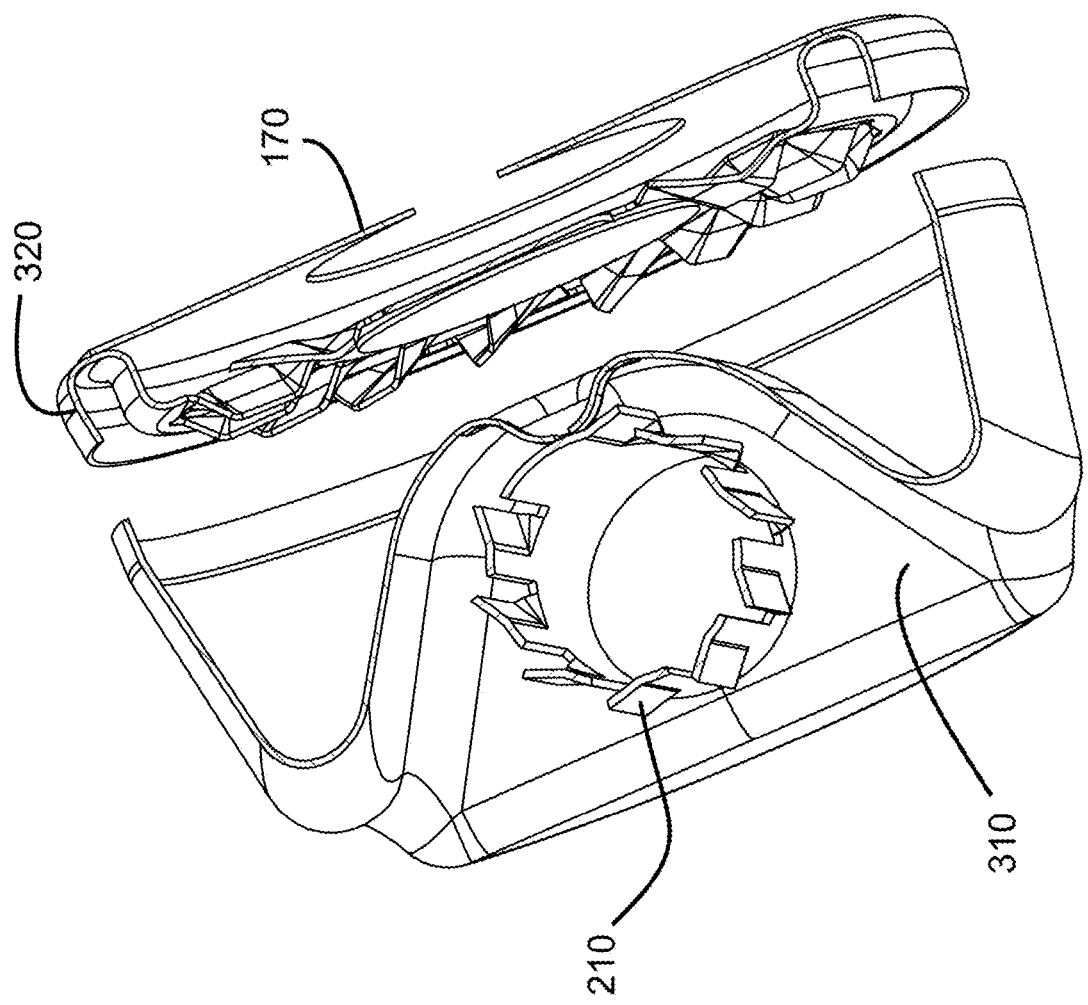
FIG. 3 presents a partly cut-away perspective of a variation of the central part of the system according to the present invention.

FIG. 3 presents a partly cut-away perspective of a variation of the central part of the system according to the present invention. As the point of view is from above (as referring to the orientation of the system in FIGS. 1 and 2), the illustrated portion of the illustrated elements corresponds to the lower portion. In this embodiment, the swirl duct 210 is a louvered tube that extends into an opening in the step portion of the divider baffle 310. The swirl promoting means 320 and the restrictor arrangement 170 are arranged downstream of the divider baffle 310. The embodiment of FIG. 3 is illustrative of the optional feature that a portion of the divider baffle 310 is shaped so as to be in contact with the swirl duct 210, thus forcing a larger portion of the gas flow into the swirl duct 210 by blocking flow around the swirl duct 210.

Figure 4:
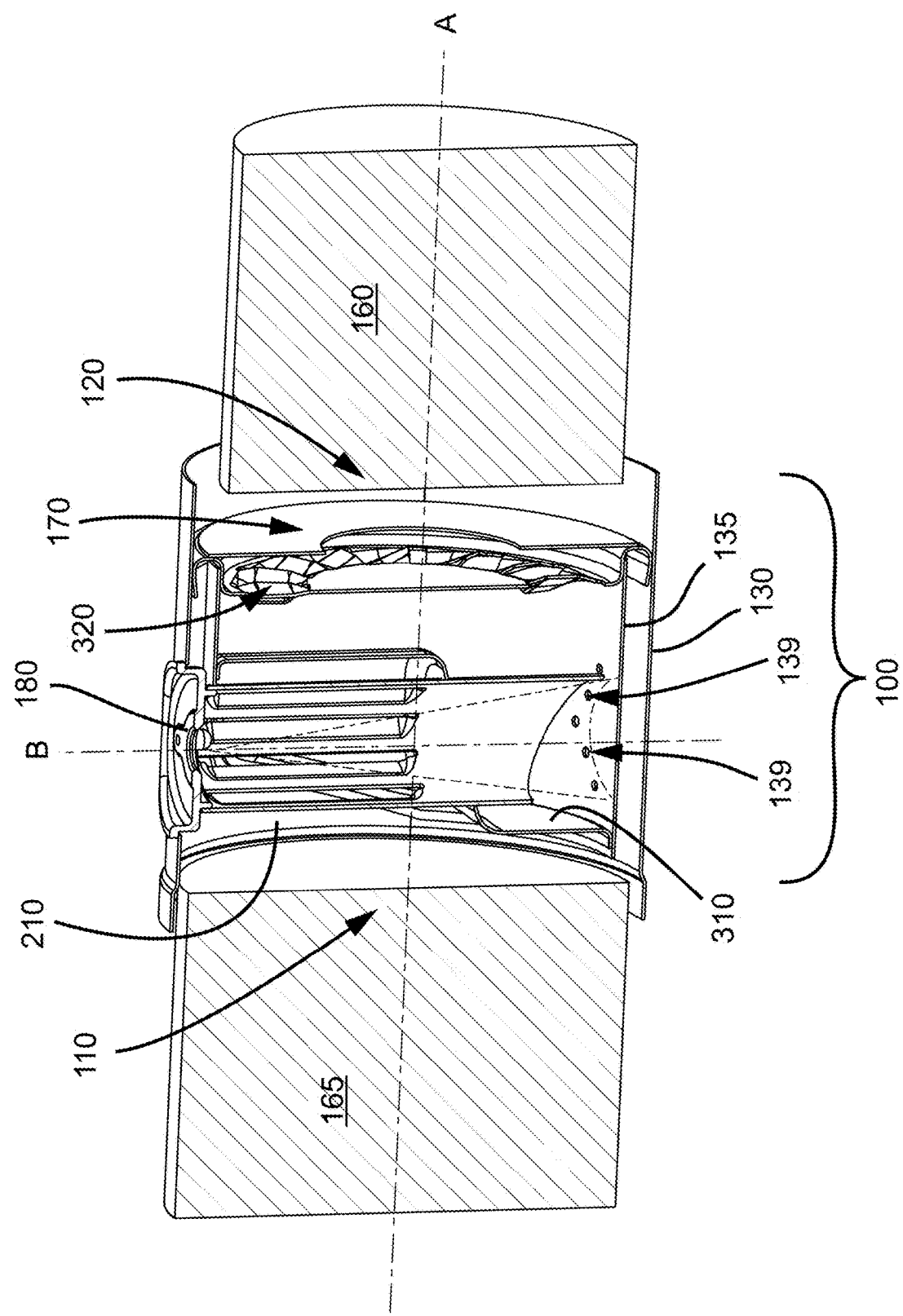
FIG. 4 presents a partly cut-away perspective of another embodiment of the system according to the present invention.

FIG. 4 presents a partly cut-away perspective of another embodiment of the system according to the present invention. In this embodiment, the system further comprises an inner sleeve 135 having an upstream end and a downstream end, whereby the upstream end is circumferentially joined to the divider baffle 310 and the downstream end is circumferentially joined to the swirl promoting means 320 or the restrictor arrangement 170 so as to leave an annular space between the inner sleeve and the circumferential wall 130. Preferably, the inner sleeve 135 is provided with at least one opening 139 ensuring fluid communication between the annular space and an inner volume enclosed by the inner sleeve 135. Thus, gas can flow both inside and around the sleeve (i.e., in the annular space between the circumferential wall 130 and the inner sleeve 135).

Optionally, at least one opening is disposed in the inner sleeve 135 in an area to be impacted by the reactant (as in the illustrated case, where the axis of the injector coincides with the longitudinal axis B of the swirl duct 210, which intersects the region provided with openings 139). Suitably arranged openings in the sleeve may thus provide a thermally stabilized grate (by convection) towards which the reactant is sprayed, thus providing a surface less prone to accumulation of solid reactant deposits than if the spray were directed to the inside of the circumferential wall 130. In the illustrated case, the swirl duct 210 (louvered tube) does not extend through the circumferential wall 130. In the illustrated case, the point of injection for the reactant spray lies inside mixer housing, so the injector orifice 180 does not extend through the outside wall. In this manner, the system can be made more compact.

Figure 5:
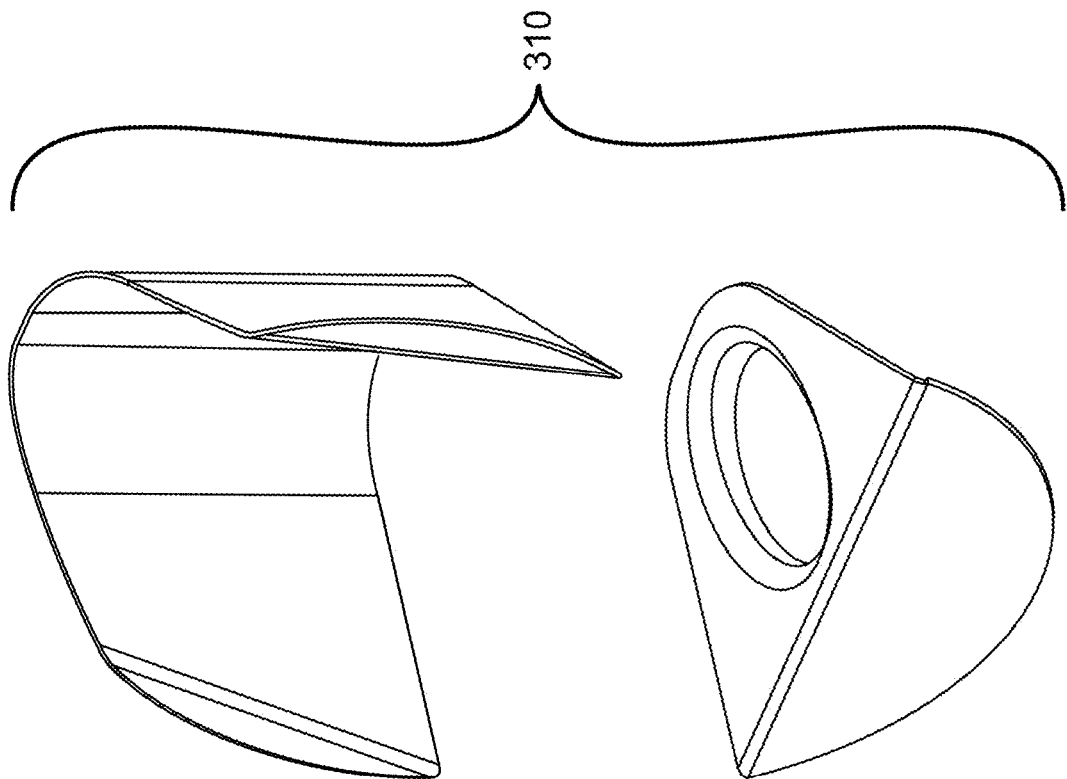
FIG. 5 presents an exploded view of a divider baffle that may be used in embodiments of the present invention.

FIG. 5 presents an exploded view of a divider baffle 310 that may be used in embodiments of the present invention. As shown in the figure, the divider baffle 310 may be constructed from multiple separate baffle portions. The bottom portion may consist of a suitably bent and perforated first plate-like element. The top portion may consist of a suitably bent second plate-like element. The separate baffle portions may be joined together in a fixed relationship. Alternatively, the separate baffle portions may retain a fixed relationship by virtue of being attached to a common structure.

In an alternative configuration (not shown in FIG. 5), the divider baffle 310 may be of a single piece, in particular it may be produced as a single suitably bent and perforated plate-like element.

Referring to FIGS. 6-11 further examples of dosing and mixing assembly are shown and explained, comprising a spray path protection zone.

Figure 6:
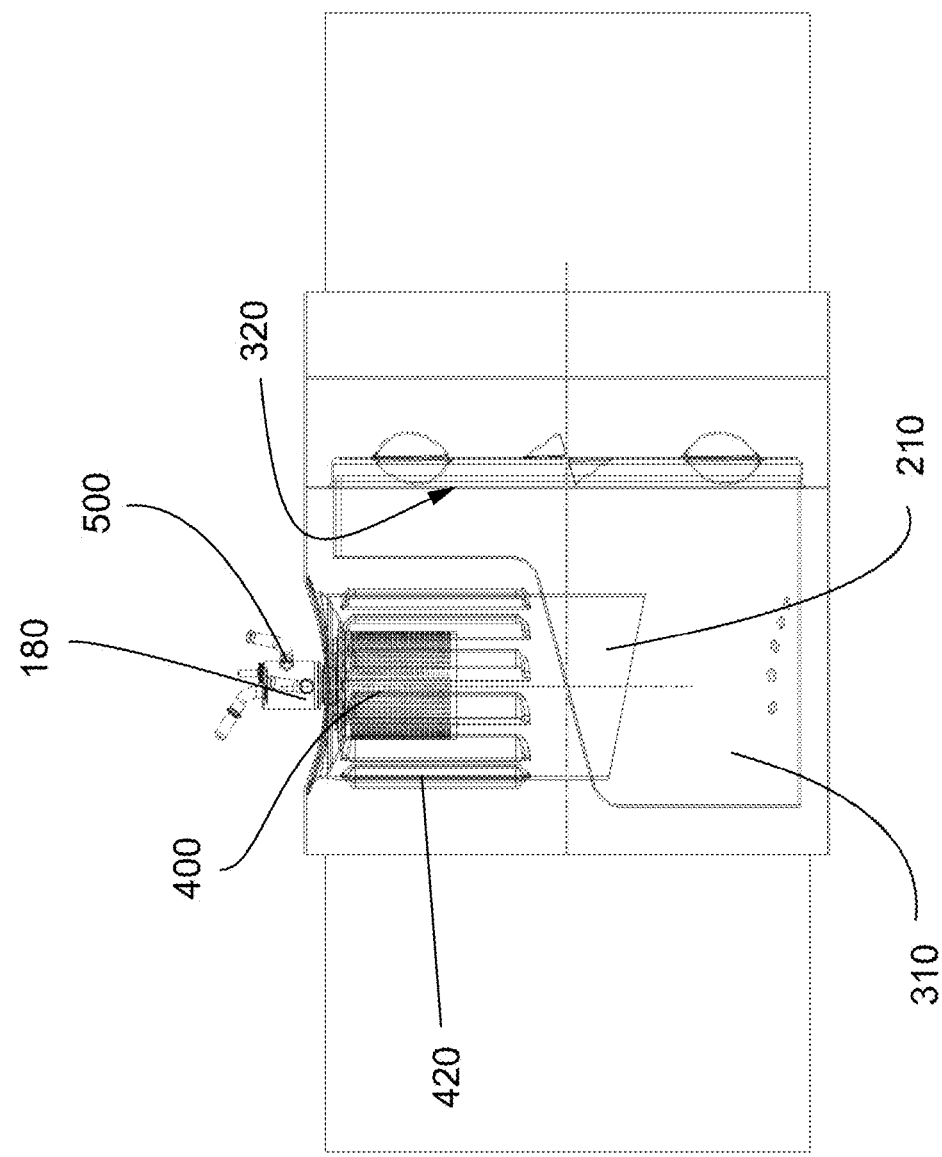
FIG. 6 is a longitudinal cross-sectional view of a second example dosing and mixing assembly including a conduit arrangement defining a spray path protection zone and mixing zone, in accordance with the principles of the present disclosure.
Figure 7:
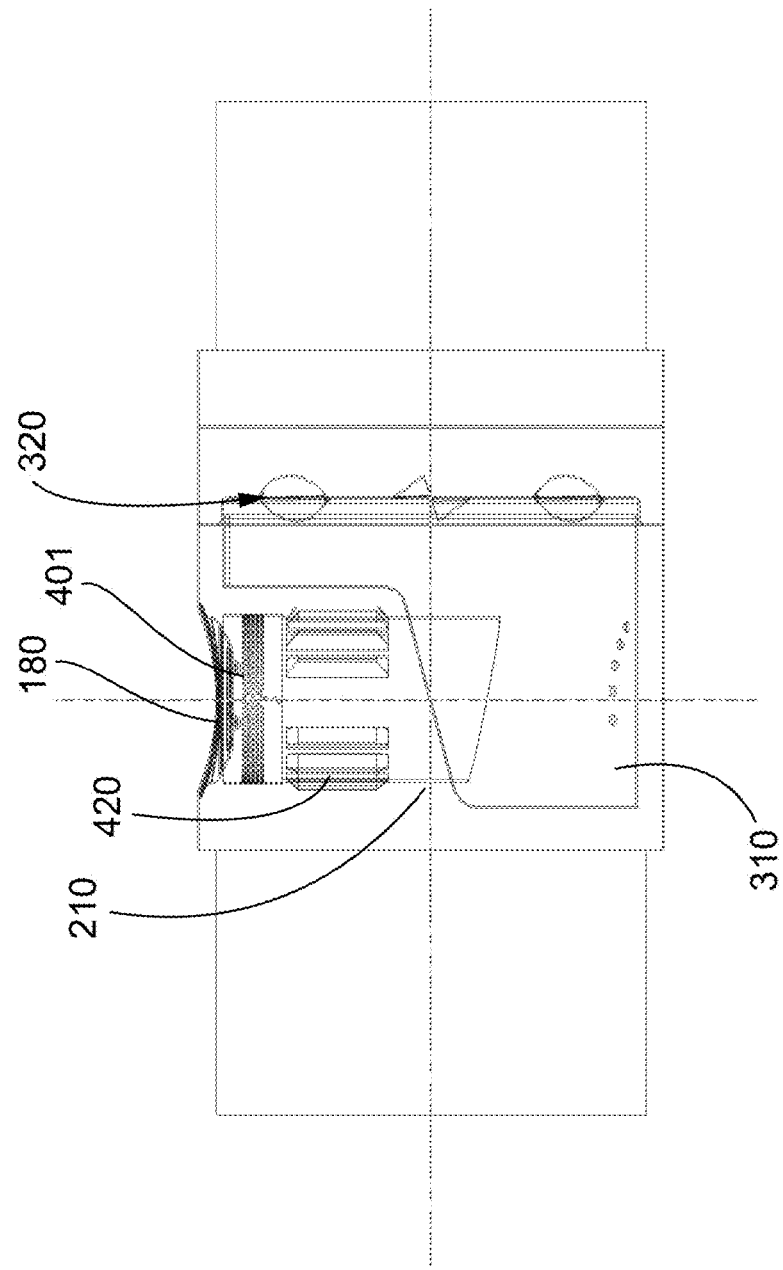
FIG. 7 is a longitudinal cross-sectional view of a third example dosing and mixing assembly including a swirl duct or conduit arrangement defining a spray path protection zone and mixing zone, in accordance with the principles of the present disclosure.
Figure 8:
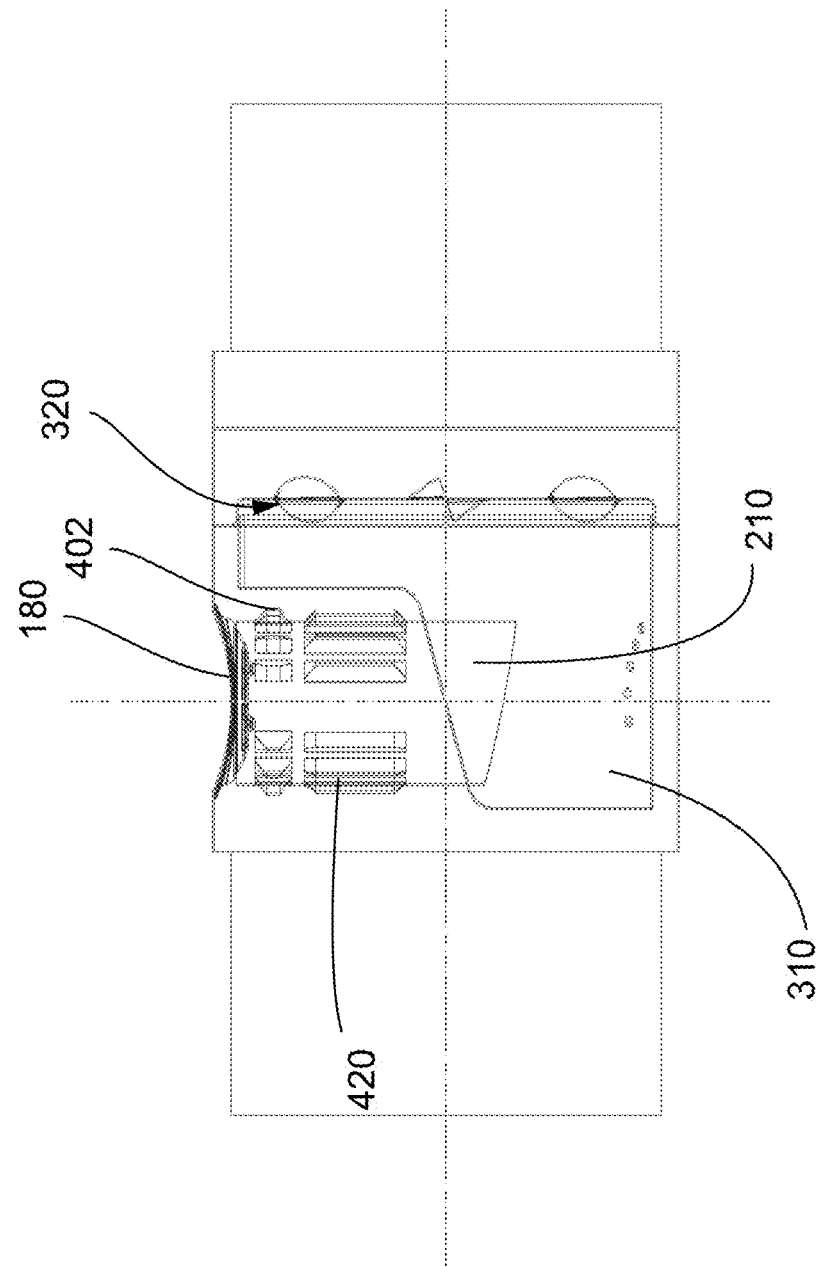
FIG. 8 is a longitudinal cross-sectional view of a fourth example dosing and mixing assembly including a conduit arrangement defining a spray path protection zone and mixing zone, in accordance with the principles of the present disclosure.

The systems depicted in FIGS. 6-8 have been depicted in a schematic way, as they differ from the systems described in relation to FIGS. 1 and 4 only in that the swirl duct comprises a spray path protection zone. The variations with a spray path protection zone can be used in embodiments with and without the presence of an inner sleeve 135. Also, the restrictor arrangement 170 is not shown in detail.

Referring to FIG. 6, a second example dosing and mixing assembly is shown. In preferred embodiments, the spray path protection zone comprises a perforated conduit disposed within the swirl duct/first conduit adjacent to the injector orifice.

The spray protection zone comprises a perforated conduit 400 or spray path protector 400 disposed within the first conduit/swirl duct 210 at the injector orifice or injector mounting location 180. The spray path protector is positioned to surround a nozzle of the injector doser 500 disposed at the injector orifice 180. The spray protector 400 inhibits flow entering the first conduit 210 from opening the spray path of the reactant too quickly. In certain examples, the spray protector 400 blocks at least some of the swirling flow from reaching the nozzle of the doser 500. In certain examples, the spray protector 400 reduces swirling and/or other large-scale turbulence in exhaust flow that reaches the nozzle of the doser 500.

In certain implementations, the spray protector 400 includes a perforated conduit. The perforations of the spray protector 400 are sized to mitigate turbulence of exhaust passing through the perforations. In certain examples, each perforation has a cross-dimension (e.g., a diameter) of less than about 5 mm. In certain examples, each perforation has a cross-dimension of less than about 4 mm. In certain examples, each perforation has a cross-dimension of about 3 mm. In certain examples, each perforation has a cross-dimension of less than about 3 mm. In certain examples, each perforation has a cross-dimension of between 2 and 4 mm. In certain examples, each perforation has a cross-dimension of between 2.5 and 3.5 mm.

In some implementations, the perforated conduit 400 is cylindrical. In other implementations, the perforated conduit 400 can have other shapes. In certain implementations, the perforations of the spray protector 400 extend over at least a majority of a circumference of the perforated conduit. In certain examples, the perforations extend over the full circumference. In other examples, the perforated conduit may define one or more non-perforated circumferential sections. In certain examples, the perforated conduit defines two oppositely disposed non-perforated circumferential sections. In an example, a non-perforated circumferential section faces towards the inlet.

In some implementations, the perforated conduit is mounted to a doser mount that also holds the doser at the doser mounting location. In other implementations, the perforated conduit is mounted to the first conduit. In certain examples, the perforated conduit 400 extends partially across the swirl duct 210. In certain examples, the perforated conduit extends across less than a majority of an axial length of the swirl duct. In certain examples, the perforated conduit extends across between 25% and 50% of the swirl duct. In preferred embodiments, the perforated conduit is arranged concentrically with the swirl duct.

As described for FIG. 1 and FIG. 4, the swirl duct further comprises a mixing portion 420 or mixer comprising a first set of louvers 42.

Referring to FIG. 7, a third example dosing and mixing assembly is shown. the spray path protection zone comprises a protection portion of the swirl duct adjacent to the injector orifice, the protection portion comprising perforations.

The first conduit/swirl duct defines a spray path protection zone upstream of the mixing portion. The flow path protection zone is disposed at the doser mounting location/injector orifice to facilitate flow of reactant from the doser 500 without prematurely opening the spray path of the reactant from the doser. Opening the spray path too quickly can lead to deposits of the reactant, which can result in build-up of deposits and blockage of the exhaust flow within the system. For example, swirling exhaust flow around the reactant injection site can push reactant radially outwardly from the spray path towards the inner surface of the first conduit/swirl duct, thereby leading to deposition of reactant on the louvers of the mixing portion or around the nozzle of the doser.

In certain implementations, the protection zone is defined by a perforated region 401 of the first conduit/swirl duct 210 disposed between the injector mounting location and the mixing portion of the swirl duct 210. The perforations at the perforated region do not impart swirling onto exhaust entering the first conduit through the perforations. In certain examples, the perforations mitigate any swirling that was imparted on the exhaust (e.g., from the exhaust moving around the exterior of the first conduit) prior to the exhaust entering through the perforations. In certain examples, the perforations mitigate any large scale turbulence that was imparted on the exhaust prior to the exhaust passing through the perforations.

In certain implementations, the perforations of the perforated region are sized to inhibit swirling and/or other turbulence of the exhaust passing through the perforations. In certain examples, each perforation has a cross-dimension (e.g., a diameter) of less than about 5 mm. In certain examples, each perforation has a cross-dimension of less than about 4 mm. In certain examples, each perforation has a cross-dimension of about 3 mm. In certain examples, each perforation has a cross-dimension of less than about 3 mm. In certain examples, each perforation has a cross-dimension of between 2 and 4 mm. In certain examples, each perforation has a cross-dimension of between 2.5 and 3.5 mm.

Figure 9:
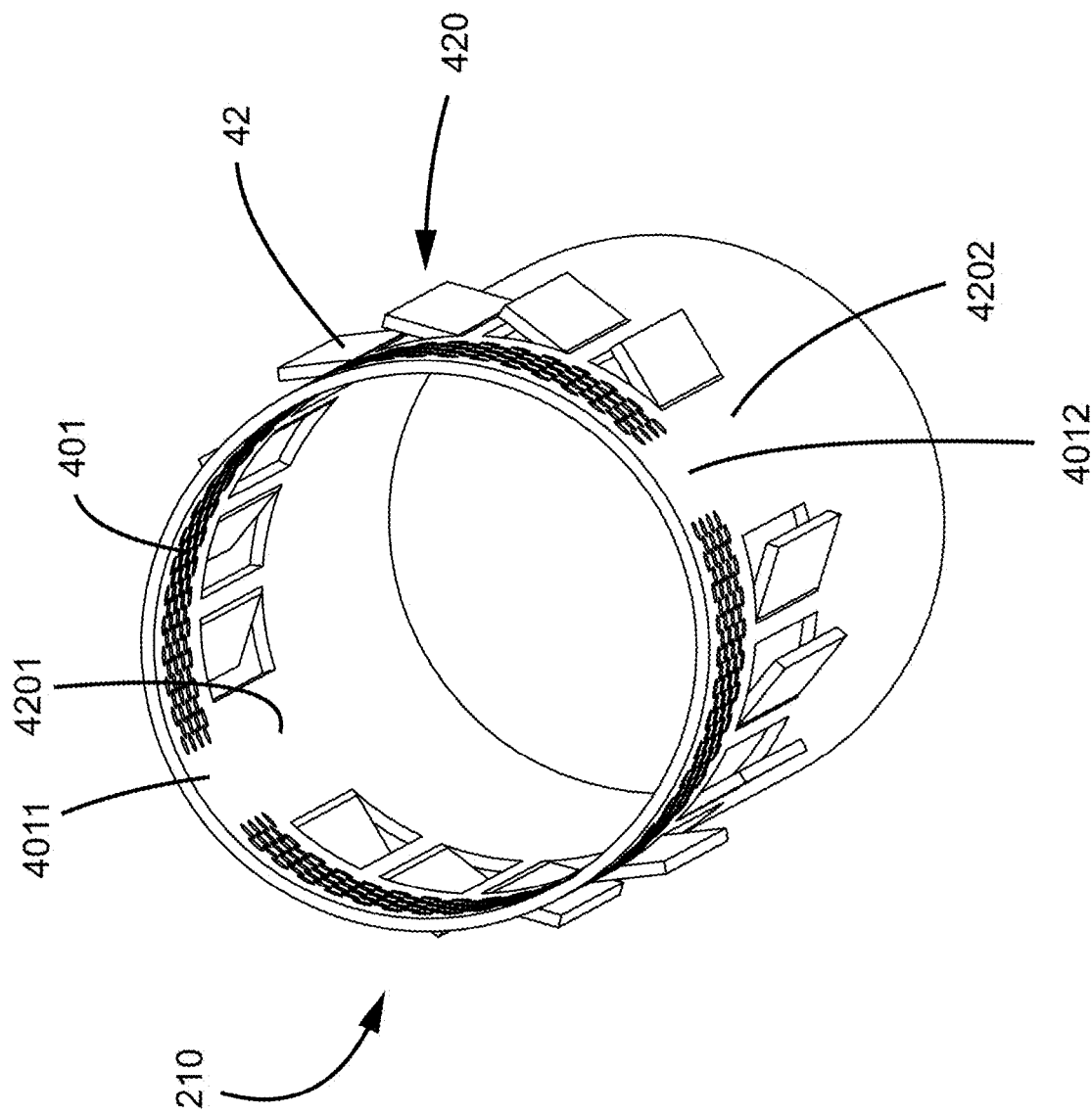
FIG. 9 is a perspective view of an alternative swirl duct similar to the swirl duct depicted in FIG. 7, for use in the third example dosing and mixing assembly of FIG. 7.
Figure 10:
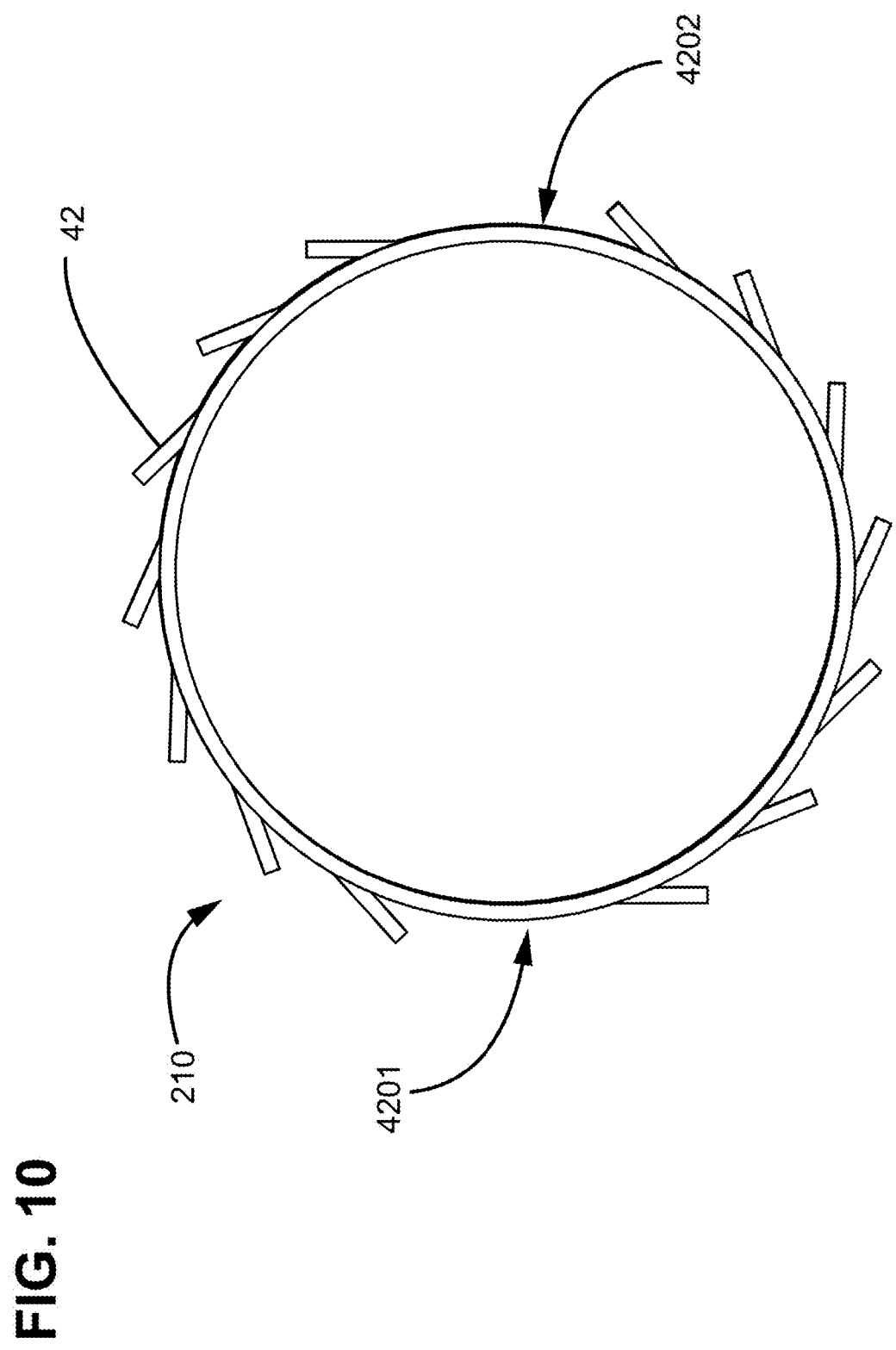
FIG. 10 is an axial end view of the swirl duct or first conduit of FIG. 9.

As shown in FIG. 9, the perforations of the perforated region extend over at least a majority of the circumference of the first conduit 210. In certain examples, the perforations of the perforated region 401 may extend over a full circumference of the first conduit. In other examples, the perforations extend over less than a majority of the circumference of the first conduit. In certain implementations, the perforated region 360 includes one or more non-perforated sections (i.e., a circumferential section of the first conduit in which the adjacent perforations bounding the section are circumferentially spaced further from each other compared to the remainder of the adjacent perforations of the perforated region). In certain examples, the perforations of the perforated region 401 are divided into two groups separated by oppositely disposed non-perforated sections 4011, 4012. The inclusion of oppositely disposed non-perforated sections results in symmetrical flow through the protection zone. In certain examples, the non-perforated sections align with non-louvered sections 4201, 4202 of the mixing region/portion 420 comprising a first set of louvers 42.

According to preferred embodiments, at least some of the exhaust flow from the inlet enters the first conduit 210 through the perforated region 401 instead of through the mixing portion. In certain implementations, less flow enters through the perforated region 401 than through the mixing portion 420. In certain implementations, at least 15% of the exhaust from the inlet flows into the first conduit 210 through the perforated region 401. In certain implementations, at least 20% of the exhaust from the inlet flows into the first conduit 210 through the perforated region 401. In certain implementations, at least 25% of the exhaust from the inlet flows into the first conduit 210 through the perforated region 401. In certain implementations, at least 30% of the exhaust from the inlet flows into the first conduit 210 through the perforated region 401. In certain implementations, at least 35% of the exhaust from the inlet flows into the first conduit 210 through the perforated region 401. In certain implementations, between about 20% and 45% of the exhaust from the inlet flows into the first conduit 210 through the perforated region 401. In certain implementations, between about 25% and 40% of the exhaust from the inlet flows into the first conduit 210 through the perforated region 401. In certain implementations, between about 30% and 35% of the exhaust from the inlet flows into the first conduit 210 through the perforated region 401.

In certain implementations, no more than 80% of the exhaust from the inlet flows into the first conduit 210 through the mixing portion 420. In certain implementations, no more than 75% of the exhaust from the inlet flows into the first conduit 210 through the mixing portion 420. In certain implementations, no more than 70% of the exhaust from the inlet flows into the first conduit 210 through the mixing portion 420. In certain implementations, no more than 65% of the exhaust from the inlet flows into the first conduit 210 through the mixing portion 420. In certain implementations, no more than 60% of the exhaust from the inlet flows into the first conduit 210 through the mixing portion 420. In certain implementations, no more than 55% of the exhaust from the inlet flows into the first conduit 210 through the mixing portion 420. In certain implementations, between about 45% and 70% of the exhaust from the inlet flows into the first conduit 210 through the perforated region 401. In certain implementations, between about 55% and 65% of the exhaust from the inlet flows into the first conduit 210 through the perforated region 401.

The exhaust flow entering through the perforated region 401 carries the reactant towards the mixing portion with minimal effect on the spray path. The flow entering the first conduit 210 through the mixing portion initially swirls around the low or non-swirling flow from the perforated region 401. The flow from the mixing region 420 mixes with the exhaust flow from the perforated region 401 as the flows progress downstream through the first conduit 210, thereby creating a swirling flow of exhaust and reactant within the first conduit 210 downstream of the mixing region 420.

Figure 11:
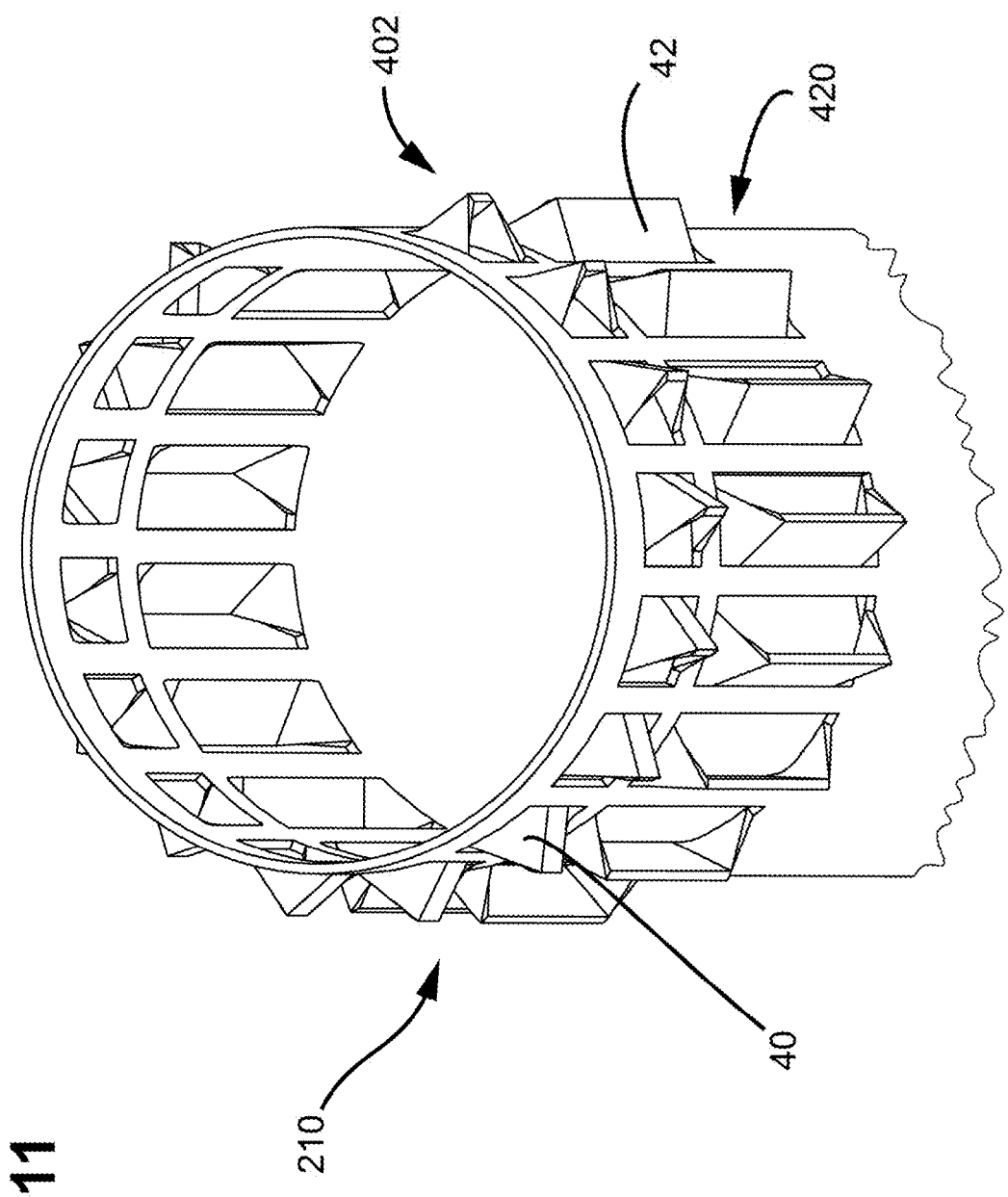
FIG. 11 is a perspective view of an example swirl duct (or first conduit) suitable for use in the fourth example dosing and mixing assembly, defining a mixing zone and a spray protection zone.

Referring to FIGS. 8 and 11, a fourth example dosing and mixing assembly is shown. The first conduit/swirl duct 210 defines a spray path protection zone upstream of the mixer portion on the swirl duct 210 (see FIG. 7). The spray path protection zone is disposed between the mixing portion 420 and the doser mounting location/injector orifice 180 to facilitate flow of reactant from the doser without prematurely opening the spray path of the reactant from the doser. Opening the spray path too quickly can lead to deposits of the reactant, which can result in build-up of deposits and blockage of the exhaust flow within the system. For example, swirling exhaust flow around the reactant injection site can push reactant radially outwardly from the spray path towards the inner surface of the first conduit 210, thereby leading to deposition of reactant on the louvers of the mixer portion 420 or around the nozzle of the doser.

In certain implementations, the protection zone is defined by a louvered section 402 of the swirl duct, comprising louvers 40, located upstream from the mixing portion/section 420. The louvered section is configured to impart swirl in an opposite direction than the mixing portion 420. A first part of the exhaust flow from the inlet will enter the first conduit 210 through the louvered section 402 while a second part of the exhaust flow from the inlet will enter the first conduit 210 through the mixing portion/mixer 420. The louvered section 402 will impart swirling in a first direction to the first part of the exhaust while the mixing portion 420 will impart swirling in a second, opposite direction to the second part of the exhaust. The interaction between these two swirling flows at the upstream end of the mixing portion 420 initially inhibits the swirling imparted by the mixing portion 420, thereby reducing the effect the mixing portion has on the spray path of the reactant dispensed from the injector doser.

In certain implementations, the louvers of the louvered section 402 are smaller (e.g., shorter along the conduit axis L) compared to the louvers of the mixing portion 420. Accordingly, less flow enters through the louvered section 402 than through the mixer 420. In certain implementations, the axial length (along the conduit axis L) of the louvers is less than half of the axial length of the mixer louvers. In certain implementations, the axial length of the louvers is between 10% and 40% of the axial length of the mixer louvers. In certain implementations, the axial length of the louvers is between 10% and 25% of the axial length of the mixer louvers. In certain implementations, the axial length of the louvers is between 15% and 20% of the axial length of the mixer louvers. In certain implementations, the total open area provided by the louvered section 402 is between about 15% and 55% of the total open area provided by the mixer/mixing portion. In certain examples, the total open area provided by the louvered section 402 is between about 25% and 45% of the total open area provided by the mixer/mixing portion.

The present invention also pertains to an exhaust treatment device for treating exhaust comprising the system for mixing a liquid spray into a gaseous flow described above, wherein an aftertreatment substrate is disposed downstream of the outlet 120, and wherein said the inlet 110 is adapted to receive an exhaust flow of an internal combustion engine.

The present invention also pertains to a motor vehicle comprising the exhaust treatment device described above.

The present invention also pertains to a motor-powered machine, in particular a diesel-powered motor vehicle, comprising the exhaust treatment device described above, arranged for the purpose of treating the exhaust produced by the vehicle's internal combustion engine.

While the invention has been described hereinabove with reference to particular embodiments, this was done to clarify and not to limit the invention, the scope of which is to be determined by reference to the accompanying claims. In particular, variations and elements which have only been described in the context of a particular embodiment, may be combined with the features of other embodiments to obtain the same technical effects.

The invention claimed is:

1. A system for mixing a liquid spray into a gaseous flow, the system comprising:

a main body having a circumferential wall defining an interior for accommodating said gaseous flow, the interior having a first longitudinal axis and extending from a first end to a second end, the first end defining an inlet opening, the second end defining an outlet opening, a divider baffle disposed inside said interior;

a swirl duct disposed within said interior along a second longitudinal axis, said swirl duct having a first end adjacent to said circumferential wall and a second end extending to said divider baffle;

an injector orifice disposed at said first end of said swirl duct and configured to receive an injector to spray reactant into the gaseous flow so that the reactant mixes with the gaseous flow in said swirl duct;

a swirl promoting means; and a restrictor arrangement;

said swirl promoting means being arranged between said divider baffle and said restrictor arrangement, such that gas passing through said swirl promoting means is swirled around said first longitudinal axis before passing through said restrictor arrangement towards said second end; and said restrictor arrangement being disposed within said interior between said swirl promoting means and said second end, said restrictor arrangement forcing gas reaching it from an upstream side away from a peripheral region of said interior towards a center axis of said main body.

2. The system according to claim 1, further comprising an inner sleeve having an upstream end and a downstream end; said upstream end being circumferentially joined to said divider baffle and said downstream end being circumferentially joined to said swirl promoting means or said restrictor arrangement so as to leave an annular space between said inner sleeve and said circumferential wall, said annular space being in fluid communication with the inlet opening.

3. The system according to claim 2, wherein said inner sleeve is provided with at least one opening ensuring fluid communication between said annular space and an inner volume enclosed by said inner sleeve.

4. The system according to claim 3, wherein at least one opening of said inner sleeve is disposed in an area to be impacted by said reactant.

5. The system according to claim 1, wherein said second longitudinal axis is at an angle with said first longitudinal axis.

6. The system according to claim 5, wherein said second longitudinal axis is substantially perpendicular to said first longitudinal axis.

7. The system according to claim 1, wherein said swirl duct and said divider baffle are configured such that the majority of a gas flow passing from an upstream side of said divider baffle towards a downstream side of said divider baffle passes through said swirl duct and through said divider baffle at said second end of said swirl duct.

8. The system according to claim 1, wherein said injector orifice does not pass through said circumferential wall.

9. The system according to claim 1, wherein said divider baffle is formed as curved perforated plate.

10. The system according to claim 9, wherein said swirl duct comprises a mixing portion comprising a first set of louvers.

11. The system according to claim 1, further comprising a spray path protection zone.

12. The system according to claim 11, wherein said spray path protection zone comprises a protection portion of said swirl duct adjacent to said injector orifice, said protection portion comprising perforations.

13. The system according to claim 10, wherein a spray path protection zone comprises a protection portion of said swirl duct adjacent to said injector orifice, said protection portion comprising a second set of louvers adjacent to said injector orifice, the second set of louvers and the first set of louvers, if present, arranged and adapted for inducing swirl in opposite directions.

14. The system according to claim 11, wherein said spray path protection zone comprises a perforated conduit disposed within the swirl duct adjacent to said injector orifice.

15. The system according to claim 1, wherein the system forms part of an exhaust treatment device for treating exhaust comprising the system for mixing a liquid spray into a gaseous flow, wherein an aftertreatment substrate is disposed downstream of said outlet opening, and wherein said inlet opening is adapted to receive an exhaust flow of an internal combustion engine.

16. The system according to claim 15, wherein the exhaust treatment device is mounted to and used by a motor vehicle.

17. The system according to claim 15, wherein the exhaust treatment device is mounted to and used by a diesel engine powered machine.

18. A system for mixing a liquid spray into a gaseous flow, the system comprising:

a main body having a circumferential wall defining an interior for accommodating said gaseous flow, the interior having, a first longitudinal axis and extending from a first end to a second end, the first end defining an inlet opening, the second end defining an outlet opening;

a divider baffle disposed inside said interior;

a swirl duct disposed within said interior along a second longitudinal axis, said swirl duct having a first end adjacent to said circumferential wall and a second end extending to said divider baffle;

an injector orifice disposed at said first end of said swirl duct and configured to receive an injector to spray reactant into the gaseous flow so that the reactant mixes with the gaseous flow in said swirl duct;

a baffle plate including direction adjusting members, the direction adjusting members being configured to swirl gas passing through said baffle plate around the first longitudinal axis; and a restrictor arrangement disposed within said interior between said baffle plate and said second end, the restrictor arrangement being, configured to receive the gas as the gas is swirling and to force the gas towards the first longitudinal axis of the main body, the baffle plate being arranged between the divider baffle and the restrictor arrangement.

19. The system according to claim 18, wherein the swirl duct defines a spray path protection zone.

20. The system according to claim 19, wherein the spray path protection zone is defined by a perforated conduit disposed within the swirl duct.

* * * * *